(12) United States Patent
Doi

(10) Patent No.: US 6,377,890 B1
(45) Date of Patent: Apr. 23, 2002

(54) NAVIGATOR

(75) Inventor: Katsuji Doi, Tokyo (JP)

(73) Assignee: Mitsubishi Denki K.K., Tokyo (JP)

( * ) Notice: Subject to any disclaimer, the term of this patent is extended or adjusted under 35 U.S.C. 154(b) by 0 days.

(21) Appl. No.: 09/582,999

(22) PCT Filed: Nov. 30, 1998

(86) PCT No.: PCT/JP98/05385

§ 371 Date: Jul. 10, 2000

§ 102(e) Date: Jul. 10, 2000

(87) PCT Pub. No.: WO00/33029

PCT Pub. Date: Jun. 8, 2000

(51) Int. Cl.⁷ .............................. G01C 2/00; G01S 5/00; G01S 13/00; G06F 7/00; G06F 17/00; G06F 19/00

(52) U.S. Cl. .............................. 701/211; 701/200–210; 701/212–215; 340/990; 340/998; 340/989; 340/995; 340/994; 340/988; 342/357; 342/357.01; 342/357.13; 342/357.09; 364/443; 364/444.1; 705/5; 705/417; 705/418; 705/400; 709/218; 709/217; 709/219

(58) Field of Search ................................ 701/200–215; 340/990, 998, 989, 995, 994, 988; 342/357.01, 357.13, 357, 357.09; 364/443, 444.1, 444.2; 705/5, 417, 418, 400; 709/218, 217, 219

(56) References Cited

U.S. PATENT DOCUMENTS

| | | | | |
|---|---|---|---|---|
| 5,765,122 A | * | 6/1998 | Nagai et al. | 701/208 |
| 5,948,040 A | * | 9/1999 | DeLorme et al. | 701/201 |
| 6,087,965 A | * | 7/2000 | Murphy | 340/991 |
| 6,124,826 A | * | 9/2000 | Garthwaite et al. | 342/357.09 |
| 6,163,748 A | * | 12/2000 | Guenther | 701/202 |
| 6,184,802 B1 | * | 2/2001 | Lamb | 340/994 |
| 6,208,934 B1 | * | 3/2001 | Bechtolsheim et al. | 701/209 |
| 6,209,026 B1 | * | 3/2001 | Ran et al. | 709/218 |

FOREIGN PATENT DOCUMENTS

| | | |
|---|---|---|
| JP | U60189149 | 12/1985 |
| JP | A492962 | 3/1992 |
| JP | A6281472 | 10/1994 |
| JP | A996539 | 4/1997 |
| JP | A9115086 | 5/1997 |
| JP | A9218051 | 8/1997 |
| JP | A1031418 | 2/1998 |
| JP | A1089998 | 4/1998 |
| JP | A10141972 | 5/1998 |

* cited by examiner

*Primary Examiner*—William A. Cuchlinski, Jr.
*Assistant Examiner*—Ronnie Mancho

(57) ABSTRACT

Route guiding information is displayed on the basis of set information and positional data when set information and positional data are set by a keyboard or are transmitted from a sensor BOX 12.

15 Claims, 6 Drawing Sheets

Ⓢ PRESENT POSITION

Ⓖ DESTINATION

| NETWORK DATA | DISTANCE DATA | FARE DATA | TIME DATA |
|---|---|---|---|
| GENERAL ROAD DATA | X1n | Y1n | T1n |
| EXPRESSWAY DATA | X2n | Y2n | T2n |
| TOLLWAY DATA | X3n | Y3n | T3n |
| FERRY/AIRCRAFT DATA | X4n | Y4n | T4n |

| NETWORK DATA | DISTANCE DATA | FARE DATA | TIME DATA |
|---|---|---|---|
| RAILWAY DATA | X5n | Y5n | T5n |
| BUS ROUTE DATA | X6n | Y6n | T6n |
| AIRCRAFT DATA | X7n | Y7n | T7n |

FIG.6
(a)
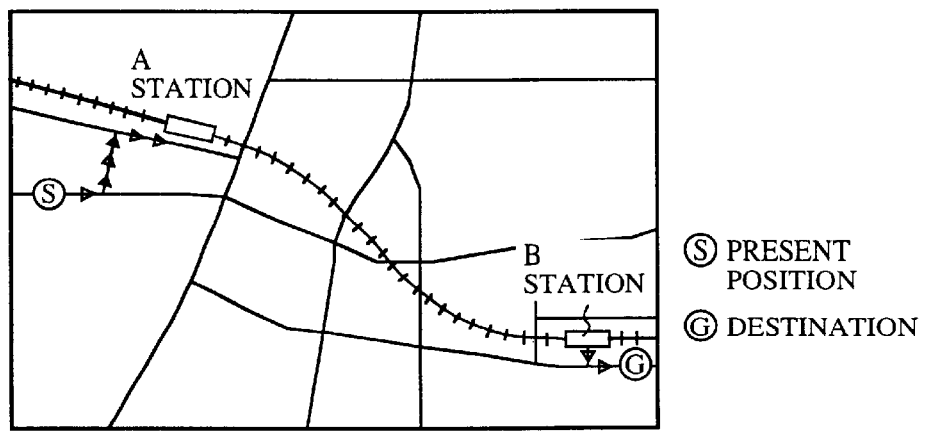
(b) ENLARGEMENT OF PRESENT ENVIRONMENT
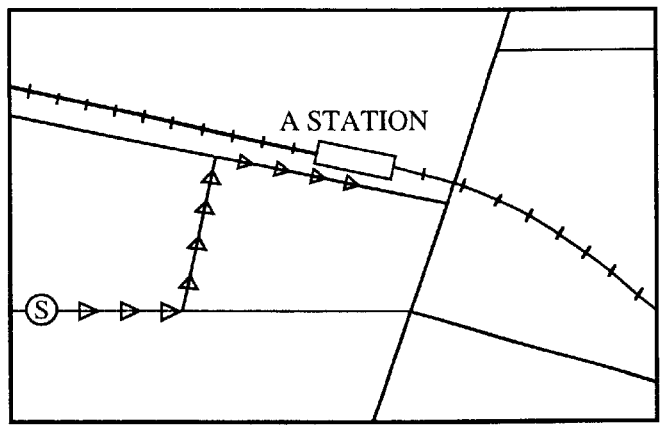
(c) ENLARGEMENT OF ENVIRONMENT OF DESTINATION
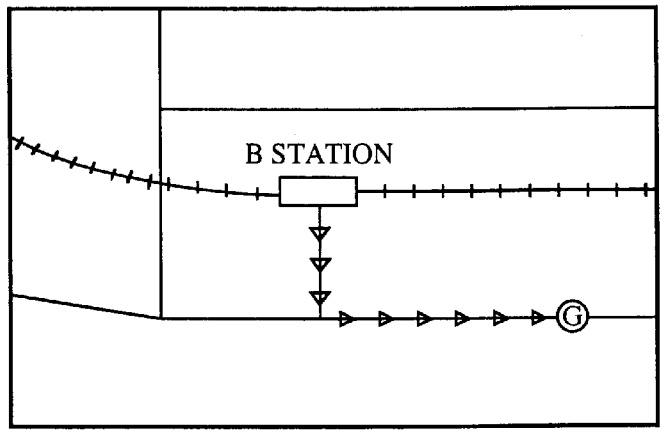

FIG.7

| INITIAL STATION | TRANSPORTATION MEANS | DESTINATION |
|---|---|---|
| · ××RAILWAY A STATION | · ××RAILWAY ○○LINE A STATION→B STATION | · △△TOWN □□ STREET NUMBER |
| · APPROX. 500m | · FARE   230YEN | · APPROX. 300m |
| · APPROX. 10min. WALKING | · APPROX. 15min. TRAVELLING TIME | · APPROX. 8min. WORKING |

FIG.8

| A STATION DEPARTURE TIMES | B STATION ARRIVAL TIMES |
|---|---|
| 12 : 00 | 12 : 15 |
| 12 : 30 | 12 : 45 |
| 13 : 00 | 13 : 15 |

FIG.9

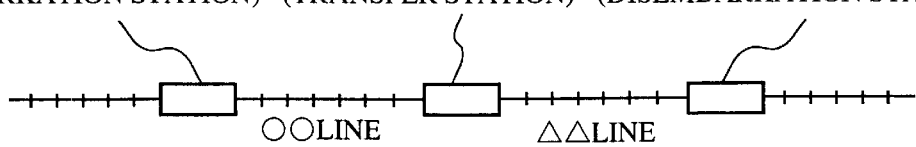

○○LINE ARRIVES ON NUMBER 8 LINE.
△△LINE DEPARTS FORM NUMBER 5 LINE.

SCHEMATIC MAP OF INTERIOR OF Z STATION

NAVIGATOR

This application is the national phase under 35 U.S.C. §371 of PCT International Application No. PCT/JP98/05385 which has an International filing date of Nov. 30, 1998, which designated the United States of America.

FIELD OF THE INVENTION

The present invention relates to a navigation device which displays route-guiding information from a present position to a destination.

BACKGROUND OF THE INVENTION

FIG. 1 shows a conventional navigation-device. In the figure, reference numeral 1 denotes a GPS antenna, 2 is the body of a navigation device, 3 is a GPS receiver which receives GPS signals from a communications satellite, 4 is a gyro which outputs rotational angle data (hereafter directional data) related to the vehicle, 5 is a CD-ROM which stores map data, 6 is a CD-ROM drive which reads map data from the CD-ROM, 7 is an operation panel which sets information such as a destination, 8 is a CPU which calculates a present position of the vehicle from the GPS signal received by the GPS receiver 3, which maps a present position and destination onto map data and which generates route-guiding information, and 9 is a monitor which displays route-guiding information.

The operation of the invention will be explained below.

The CPU 8 calculates a present position of the vehicle from the GPS signal received by the GPS receiver 3 after receiving a signal which indicates activation of the navigation system from the operational panel 7. Information related to vehicle latitude, longitude, direction, speed, height, measurement order and time is contained in the GPS measurement signal.

However when the vehicle is running in a tunnel, since the GPS receiver 3 can not receive a GPS signal, the CPU 8 calculates a present position of the vehicle from vehicle speed data and directional data output by the gyro 4.

On computing a present position of the vehicle, the CPU 8 generates route-guiding information by mapping the present position and destination input from the operational panel 7 onto map data.

When the CPU 8 has generated route-guiding information, as shown in FIG. 2, such information is displayed on the monitor 9.

Since a conventional navigation device is constructed as above, it is possible to display route-guiding information from a present position to a destination. However it is not possible for user to use the navigation device in portable form as the body 2 of the navigation device must be disposed in the vehicle. Thus the problem has arisen that route-guiding information can not be communicated to a user unless a specific vehicle is used to travel to a destination.

If a GPS antenna 1 is connected to a personal computer into which software is loaded which can execute navigation processing, it is possible to provide a simple portable navigation device (hereafter this will be termed a second conventional example). Since a personal computer employed in a second conventional example must be operated by using a mouse or keyboard, the problem of greatly reduced user friendliness has arisen. (It is possible to operate the second conventional example by using a designated operation panel 7).

The present invention is proposed to solve the above problems of the prior art and has the object of providing a navigation device which can communicate route-guiding information to a user even when a specific vehicle is not used to travel to a destination.

DISCLOSURE OF THE INVENTION

The navigation device of the present invention is provided with a guiding information display means which displays route-guiding information according to positional data and set information when such positional data and set information is set by an input means or when such positional data or set information is transmitted by a position calculation means.

In this way, even if the guiding information display means is not connected to a position calculation means, if positional data is set using an input means, it is possible to generate route-guiding information. Therefore it is possible to display route-guiding information between arbitrary geographical points in a portable device.

The navigation device of the present invention is provided with a positional calculation means in the vehicle and a guiding information display means which uses a portable computer.

In such a way, if a present position or destination is input using a computer keyboard or the like, it is possible to display route-guiding information in a portable device.

The navigation device of the present invention is adapted to display a sequence of routes from a present position to a point of embarkation on public transportation and from a point of disembarkation from public transportation to a destination. Such information is displayed as route guiding information not only as a normal sequence of routes for the vehicle but when the condition is set that public transport will be used to a destination.

In this way, it is possible to provide an optimal sequence of routes when using public transportation services.

The navigation device of the present invention is adapted to display a distance from a present position to a point of embarkation, and a distance from a point of disembarkation to a destination.

In this way, a user can recognize how far it will be necessary to walk.

The navigation device of the present invention is adapted to display required time from a present position to a point of embarkation, travel sectors and travel time on public transportation and required time from a point of embarkation to a destination.

In this way, it is possible for a user to understand an arrival time when using a public transportation service.

The navigation device of the present invention is adapted to display the fare on a public transportation service.

In this way, a user can understand the fares involved when using a public transportation service.

The navigation device of the present invention is adapted to display a timetable of a public transportation service.

In this way, a user can understand embarkation and disembarkation times when using a public transportation service.

The navigation device of the present invention is adapted to display a guide to transfers on public transportation services when transfers must be made on a plurality of public transportation services.

In this way, it is possible for a user to change public transportation services smoothly.

The navigation device of the present invention is adapted to display a sequence of routes from a present position to a destination during the display of route-guiding information when the condition has been set that a taxi will be used to the destination.

In this way, it is possible to provide a sequence of routes when using a taxi.

The navigation device of the present invention is adapted to display a distance from a present position to a destination.

In this way, it is possible for a user to recognize how far it will be necessary to ride in a taxi.

The navigation device of the present invention is adapted to display a required time from a present position to a destination.

In this way, it is possible for a user to recognize an arrival time when using a taxi.

The navigation device of the present invention is adapted to display a taxi fare.

In this way, it is possible for a user to recognize transportation costs when using a taxi.

The navigation device of the present invention is adapted to transmit vehicle positional data by using a radio circuit to a monitoring center which processes vehicle position.

In this way, it is possible for a monitoring center to track a present position of a vehicle in which a navigation device is mounted.

The navigation device of the present invention is adapted to transmit vehicle positional data by using a telephone circuit to a monitoring center which processes vehicle position.

In this way, it is possible for a monitoring center to track a present position of a vehicle in which a navigation device is mounted.

BRIEF DESCRIPTION OF THE FIGURES

FIG. 6 is a figure of a screen showing route-guiding information when public transportation services are used.

FIG. 7 is a figure of a screen showing the distance and the public transportation services to a first station.

FIG. 8 is a figure of a screen showing a timetable of public transportation services.

FIG. 9 is a figure of a screen showing transfers between public transportation services.

PREFERRED EMBODIMENTS OF THE INVENTION

In order to explain the invention in greater detail, the preferred embodiments will be explained below with reference to the accompanying figures.

Embodiment 1

Figure 3:
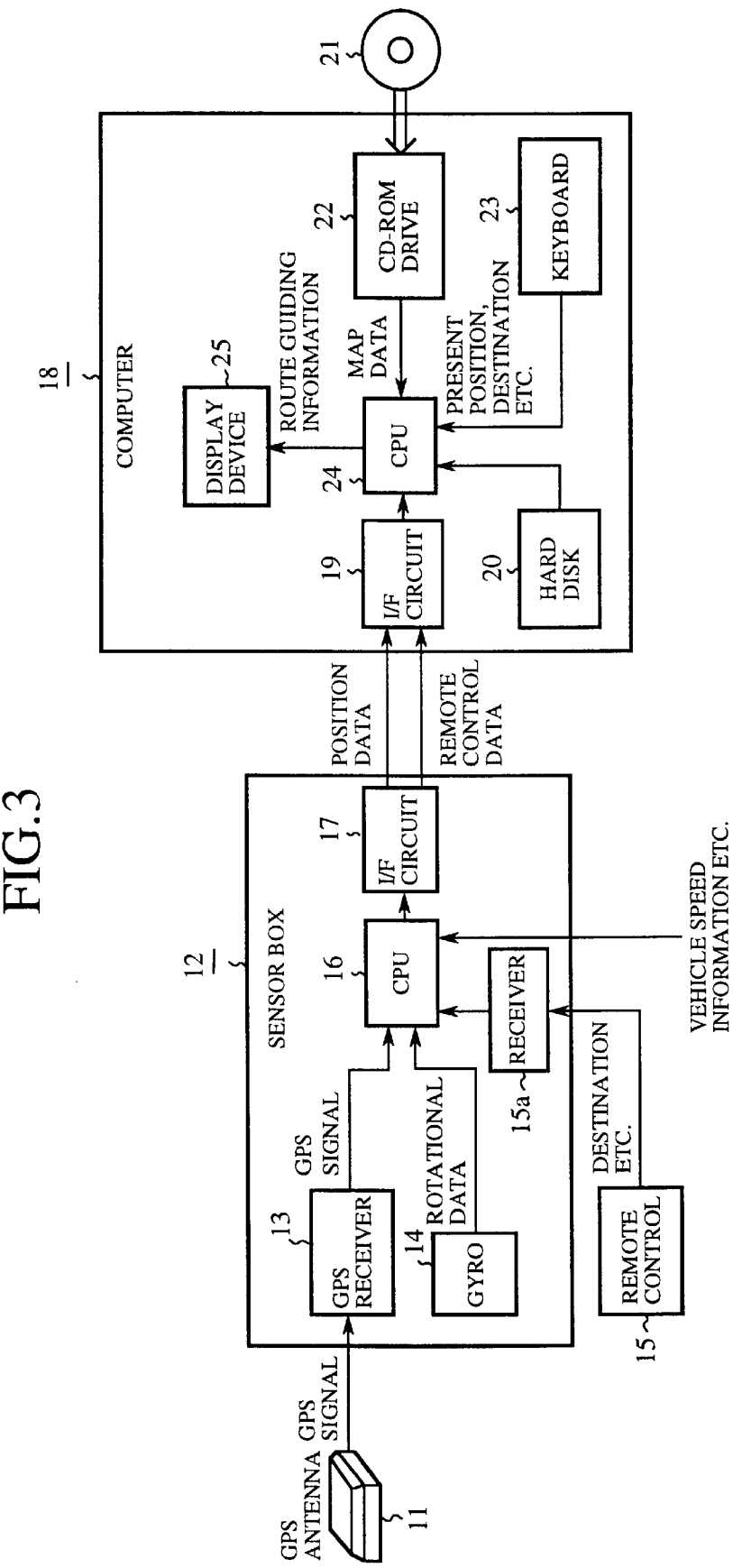
FIG. 3 shows a navigation device according to a first embodiment of the present invention.

FIG. 3 shows navigation device according to a first embodiment of the present invention. In the figure, reference numeral 11 denotes a GPS antenna, 12 is a sensor BOX (position calculation means) which calculates a present position of the vehicle and transmits positional data showing the present position and set information such as destinations which are set by a remote controller 15 to a computer 18, 13 is a GPS receiver which receives a GPS signal from a communications satellite, 14 is a gyro which outputs vehicle directional data, 15 is a designated remote controller (operation means) which sets necessary information (for example destinations) for navigation and which transmits set information (remote control operation data) to a CPU 16 through a receiver 15a by infrared signals, radio signals or land line signals. 15a is a receiver 1 for the sensor BOX 12. 16 is a CPU which calculates a present position of the vehicle from the GPS signal received by the GPS receiver, 17 is an interface circuit (hereafter I/F circuit) for the sensor BOX 12.

18 is a computer (guiding information display means) which displays route-guiding information depending on set information and positional data when such set information and such positional data are input by a keyboard or when positional data or set information are transmitted from the sensor BOX 12. 19 is an interface circuit which is connected through a I/F circuit 17 and RS232C cable of the sensor BOX 12 (hereafter I/F circuit), 20 is a hard disk on which such information as the navigation software is stored, 21 is a CD-ROM which stores map data, 22 is a CD-ROM drive which reads map data from the CD-ROM 21, 23 is a general-purpose keyboard (input means) which sets a present position, destination and the like when the computer 18 is separated from the sensor BOX 12, 24 is a CPU which generates route-guiding information by mapping a present position or destination of the vehicle onto map data, and 25 is a display device which displays route-guiding information.

Next the operation of the invention will be explained.

The CPU of the sensor BOX 12 which is provided in the vehicle processes the present position of the vehicle from the GPS signal received by the GPS receiver 13 after a signal which indicates that the navigation system has been activated is received from the remote controller 15. Information such as the latitude, longitude, direction, speed, measured dimensions time of the vehicle are contained in the GPS signal.

However when the vehicle is running in a tunnel, since the GPS receiver 13 can not receive the GPS signal, the CPU 16 processes the present position of the vehicle from vehicle speed information and directional data output from the gyro 14.

The CPU 16 outputs set information (remote controller operation data) input from the remote controller 15 and position data showing the present position of the vehicle to an external component through the I/F circuit 17.

In this way, when the computer 18 is connected to the sensor BOX 12 through an RS232C cable, the I/F circuit 19 of the computer 18 receives set information and positional data output from the I/F circuit 17 of the sensor BOX 12.

The CPU 24 of the computer 18 generates route-guiding information by mapping the present position and destination of the vehicle onto the map data when the I/F circuit 19 receives set information and positional data.

Figure 1:
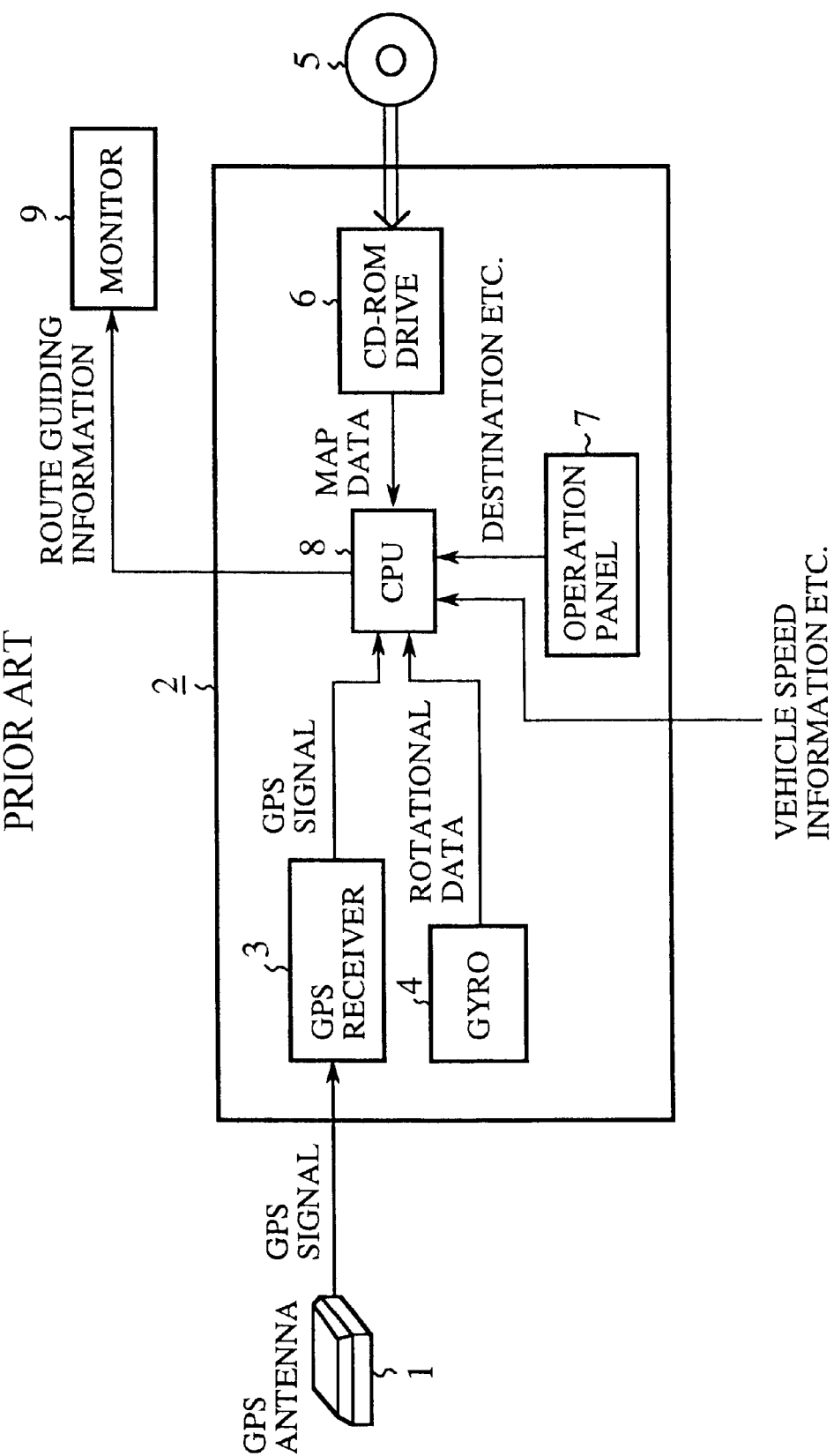
FIG. 1 shows a conventional navigation device.
Figures 2, 4, 5:
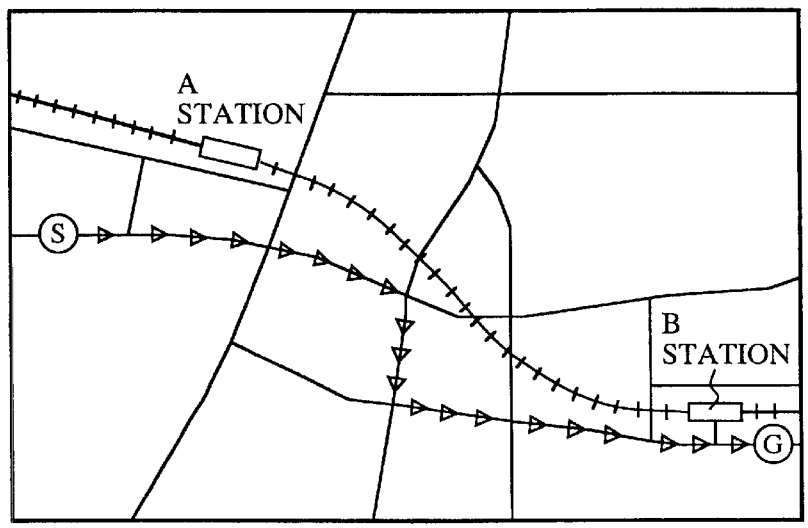
FIG. 2 is a figure of a screen, showing route-guiding information to a usual destination.
FIG. 4 is a table showing an example of network data related to routes.
FIG. 5 is a table showing network data related to public transportation services.

When route-guiding information has been generated, the CPU 24 displays route-guiding information on the display device 25 as shown in FIG. 2.

On the other hand, when the computer 18 is not connected to the sensor BOX 12, since it is not possible to receive set information and positional data from the sensor BOX 12, it is not possible to operate the designated remote controller 15. However if a present position and destination are input from the keyboard, since it is possible for the CPU to generate route-guiding information even if positional data and set information are not received from the sensor BOX 12, and thus route-guiding information can still be displayed on the display device 25.

Therefore if a user does not use a vehicle and for example moves by walking, it is possible to display route-guiding information from a present position to a destination if the computer is portable.

As is clear from the explanation above, a first embodiment is adapted to display route-guiding information on the basis of positional data and set information, when positional data and set information are set by a keyboard or when set information or positional data are transmitted from a sensor BOX (set information which is set by a remote controller 15). Thus when a computer 18 is connected to a sensor BOX 12, it is possible to display route-guiding information by operating an improved designated remote controller 15. On the other hand, when the computer 18 is portable, it is possible to display route-guiding information if positional data and set information are set using a keyboard 23.

Furthermore in the first embodiment, a remote controller 15 is used to input set information. However it is possible to input set information using another switch provided in the vehicle (such as a switch provided on the console, a switch on the display device 25, a switch on the driving wheel or the like).

Embodiment 2

The first embodiment above was explained on the basis of displaying route-guiding information when a user does not use a specific vehicle and moves by walking. When conditions for the use of public transportation services (for example train, bus, plane or the like) to a destination are set by a keyboard 23, it is possible to display the sequence of routes from a present point to a point of embarkation on public transportation services and the sequence of routes from a point of disembarkation from public transportation services to a destination.

More precisely, although network data related to roads are normally stored on a recording medium such as a CD-ROM 21, (refer to FIG. 4), network data related to public transportation services may also be stored therein (refer to FIG. 5).

For example, when a condition of using a train to reach a destination is set, route-guiding information from a present position to a first station (embarkation station) and route-guiding information from a disembarkation station to a destination is generated and displayed by referring to network data which relate to trains and network data which relate to roads (refer to FIG. 6).

In this way, it is possible to supply a user with an optimal sequence of routes when using public transportation services.

Embodiment 3

In embodiment 2 above, when the condition of using tip public transportation to reach a destination is set, a sequence of routes from a present position to an embarkation point on public transport and a sequence of routes from a disembarkation point on public transport to a destination is generated and displayed. However the items below may also be displayed (refer to FIG. 7). In this way, a user can understand fares and arrival times to a destination.

Distance from a present position to a destination
Distance from a disembarkation point to a destination
Required time from a present position to an embarkation point
Travelling time on public transportation
Required time from a disembarkation point to a destination
Fares on public transportation
Embarkation station on public transportation Embodiment 4

In embodiment 3 above, distance from a present position to a destination was displayed. However the timetable of a public transportation service may also be displayed (refer to FIG. 8).

In this way, a user may understand embarkation and disembarkation times on public transportation.

Embodiment 5

In embodiment 4 above, timetables of public transportation were displayed. However when transfers between a plurality of public transportation services are involved, transfer guides of public transportation services may be displayed (refer to FIG. 9).

In this way, a user may make smooth transfers between public transportation.

Embodiment 6

In embodiment 2 above, when a condition of using public transportation to a destination was set, a sequence of routes from a present position to an embarkation point on public transportation and from a disembarkation point to a destination is displayed. However when condition that a taxi will be used to reach the destination is set, the list of items below may be displayed together with the sequence of routes from a present position to a destination.

In this way, a user can understand fares and arrival times to a destination.

Distance and sequence of routes from a present position to a destination Required time from a present position to a destination Taxi fares (taxi fares are calculated for example from distance and required time).

Embodiment 7

Figure 10:
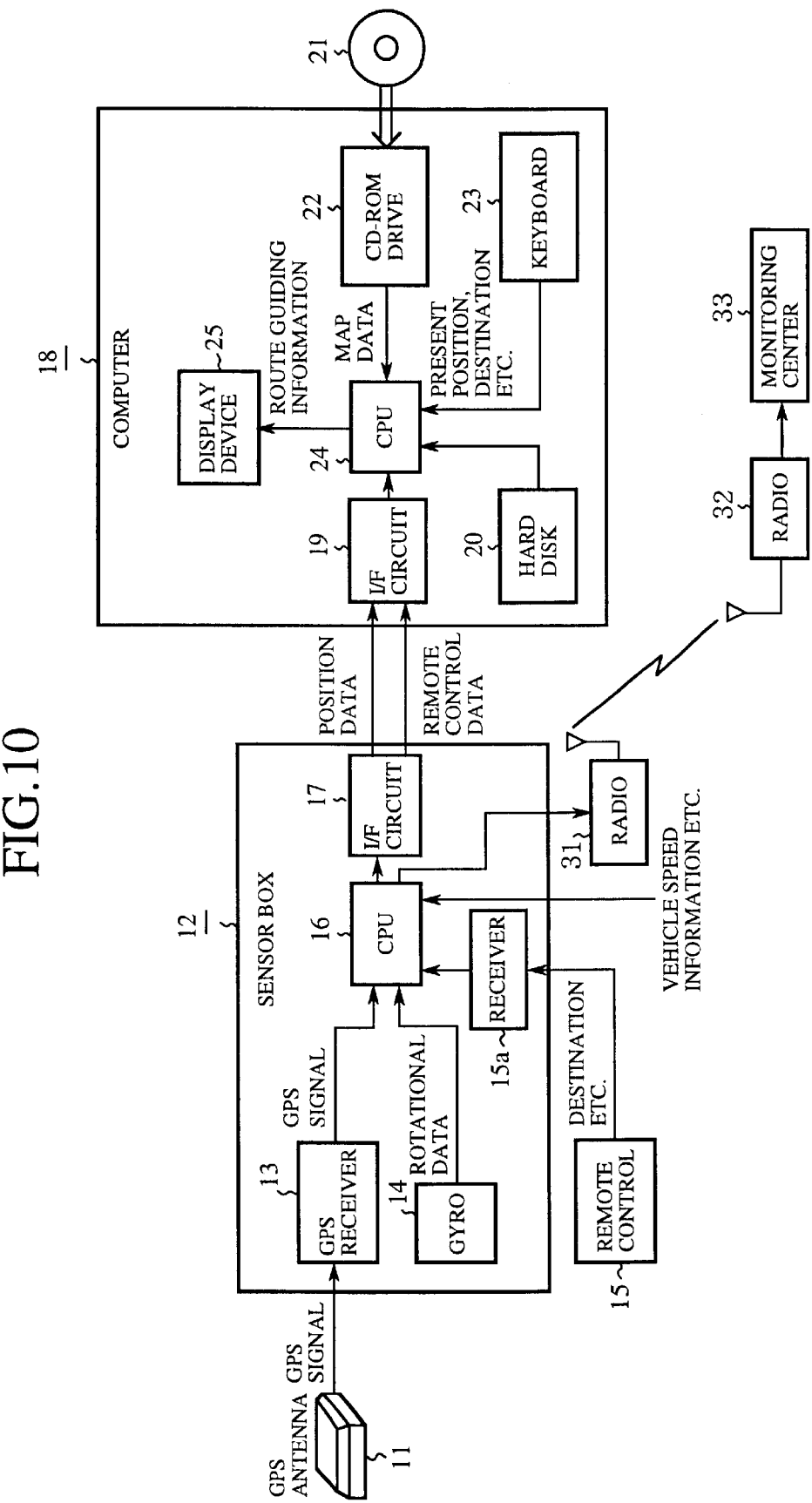
FIG. 10 is a figure showing a navigation device according to a seventh embodiment of the present invention.

FIG. 10 shows a navigation device according to a seventh embodiment of the present invention. In the figure, those elements that are similar or the same to the elements of FIG. 3 are designated by the same reference numerals and will not be explained again.

Reference numeral 31 denotes a radio which sends each kind of information and vehicle positional data (for example running speed, (including maximum speed, average speed), gear position, fuel consumption, idling time, running time, running route and the like) to a monitoring center 33. 32 is a radio which receives each kind of information and positional data relating to the vehicle transmitted by the radio 31 which is connected to a sensor BOX 12. 33 is a monitoring center which calculates vehicle position and the like based on positional data when the radio 32 receives each kind of information and position data relating to the vehicle.

The operation of the vehicle will be explained below.

In embodiments 1–6 above, route-guiding information was displayed on the vehicle computer 18. However vehicle positional data and each kind of information may be transmitted to a monitoring center 33 by using a radio circuit.

In this way, it is possible to indicate a suitable vehicle position of each vehicle so that a transportation company may ascertain the position of respective vehicles.

Furthermore since communication with a monitoring center 33 is possible without the provision of a computer 18 which has a navigation function or map data, reductions in price are available to a user.

Furthermore, in embodiment 7, although vehicle data and the like is transmitted using a radio circuit, a telephone circuit may also be used for transmission to achieve the same effect.

INDUSTRIAL APPLICABILITY

As shown above, the navigation device of the present invention is adapted to calculate an optimal sequence of routes when a user does not understand the sequence of routes from a present position to a destination. The unit need not be fixed to the vehicle since the device comprises a general-purpose computer which can be freely carried.

What is claimed is:

1. A navigation device comprising
   a designated operation means which sets information necessary for navigation,
   a position computation means which computes a present position of a vehicle and which transmits positional data showing a present position and set information received from said designated operation means,
   a general-purpose input means which sets positional data showing a present position and information necessary for navigation, and
   a guiding information display means which displays route-guiding information based on positional data and set information when such positional data and set information is set by said general-purpose input means or by said position computation means;
   wherein the designated operation means and the position computation unit are disposed in the vehicle and the general-purpose input means and the guiding information display means are a portable unit that is operable both when attached to and removed from the position computation means.

2. A navigation device according to claim 1 wherein said position computation means is disposed in a vehicle and said guiding information display means is comprised of a portable computer.

3. A navigation device according to claim 1 wherein when route-guiding information is displayed on a guiding information display means, a sequence of routes from a present position to an embarkation point on public transport and a sequence of routes from a point of disembarkation of public transportation to a destination are displayed when a condition is set that public transportation will be used to reach a destination.

4. A navigation device according to claim 1 wherein said guiding information display means displays a distance from a present position to an embarkation point and a distance from a disembarkation point to a destination.

5. A navigation device according to claim 1 wherein said guiding information display means displays a required time from a present position to an embarkation point, a travelling time on public transport and a required time from a disembarkation point to a destination.

6. A navigation device according to claim 1 wherein said guiding information display means displays fares related to public transportation.

7. A navigation device according to claim 1 wherein said guiding information display means displays a timetable of public transportation.

8. A navigation device according to claim 1 wherein said guiding information display means displays a transfer guide between public transportation services when the route involves transfers between a plurality of public transportation services.

9. A navigation device according to claim 1 wherein when route-guiding information is displayed by said guiding information display means, said guiding information display means displays a sequence of routes from a present position to a destination when a condition is set that a taxi will be used to reach the destination.

10. A navigation device according to claim 1 wherein said guiding information display means displays a distance from a present position to a destination.

11. A navigation device according to claim 1 wherein said guiding information display means displays a required time from a present position to a destination.

12. A navigation device according to claim 1 wherein said guiding information display means displays a taxi fare.

13. A navigation device according to claim 1 wherein said position computation means transmits vehicle positional data by using a radio circuit to a monitoring center which computes a position of the vehicle.

14. A navigation device according to claim 1 wherein said position computation means transmits positional data of the vehicle by using a telephone circuit to a monitoring center which computes a position of the vehicle.

15. A portable unit for a navigation system comprising
   a general-purpose input means which sets positional data showing a present position and information necessary for navigation, and
   a guiding information display means which displays route-guiding information based on positional data and set information when such positional data and set information is set by said general-purpose input means or by a fixed unit;
   wherein the portable unit is removable from a vehicle and operable both when attached to or removed from the fixed unit and the general-purpose input means can receive data from the fixed unit.

* * * * *